(No Model.)

S. GEORGE.
PARLOR GAME.

No. 481,859. Patented Aug. 30, 1892.

WITNESSES:-
Walter E. Allen.
Wm E. Knight.

INVENTOR:-
Staughton George.
By- Knight Bros.
ATTYS.

UNITED STATES PATENT OFFICE.

STAUGHTON GEORGE, OF WILLIAMSPORT, PENNSYLVANIA.

PARLOR GAME.

SPECIFICATION forming part of Letters Patent No. 481,859, dated August 30, 1892.

Application filed May 27, 1892. Serial No. 434,649. (No model.)

*To all whom it may concern:*

Be it known that I, STAUGHTON GEORGE, a citizen of the United States, residing at Williamsport, in the county of Lycoming and State of Pennsylvania, have invented a new and Improved Parlor Game, of which the following specification, taken in connection with the accompanying drawings, is a full, clear, and exact description.

The improvement relates to that class of games which comprises a suitable board having characters marked on its face, counters adapted to be placed on the board, and a dial or dice for indicating chance numbers for placing the counters.

Figure 1:
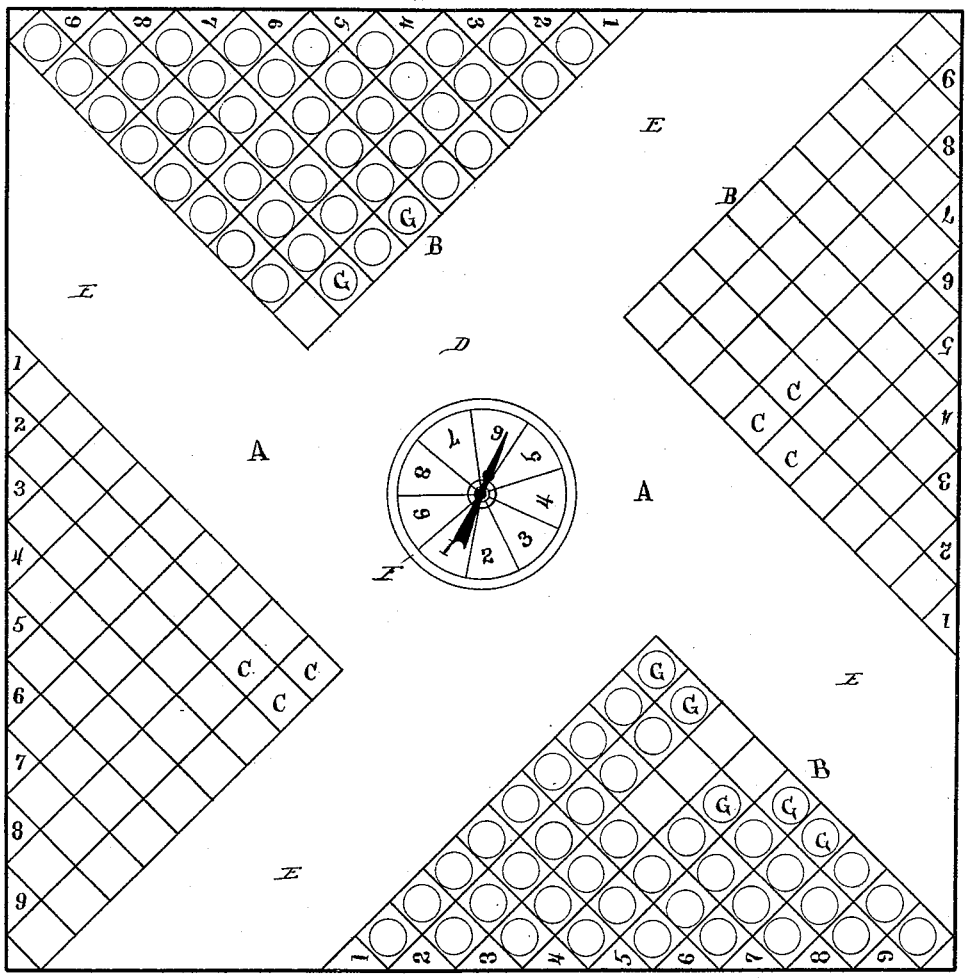
Figure 2:
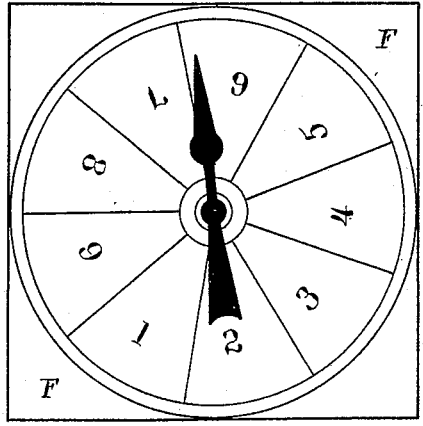

In the accompanying drawings, Figure 1 represents a top plan view of the game-board, and Fig. 2 a top plan view of the spinning-dial.

The board A is formed in the shape of a square with four triangular series B of squares or blocks C arranged on the four opposite sides of the square adjacent to each of the four corners and formed by series of crossing lines running parallel with the diagonals of the square. One side of each of these triangular series of blocks or squares projects a little beyond the diagonal of the board. This arrangement of blocks or squares leaves a central open space D and spaces E between each series of blocks.

F is an ornament.

Arranged along the outer edge of each series of squares or blocks is a series of numbers ranging from one to nine and beginning at the left-hand corner and extending to the right-hand corner. Each one of these numbers represents a line of squares extending to the right of it, and it will be observed that there are nine squares in the line of No. 1, eight in the line of No. 2, seven in the line of No. 3, and so on down to No. 9, which contains but one square.

F is a disk provided with a circular series of numbers ranging from one to nine to correspond with the numbers on the squares or blocks and a rotatable index adapted to indicate one of these numbers when twirled or rotated.

G are the counters, adapted to be placed on the squares, as hereinafter indicated in the rules of the game.

*Rules.*—The game is played by two, three, four, or eight persons. Should four play, they should play partners, two to act as twirlers, two as markers. Opponents sit opposite each other. The two twirlers spin the dial in turn and the one getting the highest number plays first. The first twirler now takes the dial in his hand and spins it and immediately calls out "What is it?" The opposite twirler guesses a number before the dial stops turning. The first twirler then promptly shows the dial-face to the marker opposed to him and calls out the number to which the hand or index points. Should the guess be correct, the dial is then passed over to the opposite twirler, and the marker on that side places a counter on the first block or square to the left of the row of figures and on the row of the number guessed. Should the number not be guessed correctly, the first twirler continues to play until a correct guess is made, each time announcing the number indicated on the dial and his marker placing a counter on the block opposite the number indicated on their corner of the board.

To win the game, all the blocks except one must be filled with counters. There are blocks for nine 1's, eight 2's, seven 3's, six 4's, five 5's, four 6's, three 7's, two 8's, and one 9. The person guessing must never guess a number the blocks of which are all filled on the opponent's corner. Every time a number is indicated on the dial the blocks or squares of which row are filled the marker must take off the counter from the block on the inner row, which can be played on again the next time the dial indicates that number.

*Example.*—There is but one block for 9. If in play it has been filled, although the opponent cannot guess nine, yet if the dial denotes "9" it must be taken off and the play proceeded with until guessed out.

The rule applies to all numbers, so that some numbers may be played on and off again from the inner row a great many times before the game is ended, making it very interesting.

*Forfeits.*—Should the twirler in the excitement of the game call a number instead of asking "What is it?" he loses his turn and must pass the dial over to his opponent. Should the person guessing guess a number the blocks of which are all filled on his table, but open on his opponent's table, he at once asks "What will you give me?" and the marker of the opposite side must give two or more numbers that are open on the guesser's table to equal the number guessed, or if there are no two or three numbers which will equal it then one number nearest in value to the one guessed must be given.

*Example.*—Suppose all the blocks are filled excepting one of each of the inside rows of 8 7 5 6 2. The guesser guesses nine, which is open on his opponent's table, and as he is entitled to nine he must be given 7 and 2. Should the guesser guess a number which is filled on his opponent's table or corner, he loses his turn.

The markers of opposite sides must watch each other carefully to see that the game is kept correctly, and if detected in an error—in putting on the wrong row of numbers, failing to take one off when required, forgetting to put one on, or guessing wrong—the side loses its turn and must pass the dial over to the opponent.

*General instructions.*—When but two are playing, each does his own marking and twirling. When three are playing, the one to the left hand guesses, and the dial is passed to the left, each doing his own marking. Eight may play the game, four as twirlers and four as markers. In playing two-handed or four-handed but two of the corners or blocks are used. The whole four corners are not used except when four are playing single-handed or eight playing as partners.

In playing lay the board on a table or stand diagonally, with the corner toward the player, so that the figures may be read more easily.

The game cannot be blocked. Say a guesser should guess one all the time, trying to prevent the filling out of the row of 1's. Should the rows of 2's and 3's be filled on his table and the 4 row on his opponent's table be open, he can guess four all the time until he gets it, and then would be entitled to fill four of the blocks of his 1 row, and so on until the row is filled, and the same with any other number.

Having thus fully described the nature of my said invention, the following is what I claim as new therein and desire to secure by Letters Patent:

1. A game-board in the form of a square and having two or more triangular series of small squares or blocks arranged along its sides adjacent to the corners and numbers for each line of squares or blocks, substantially as set forth.

2. A square game-board having four triangular series of small squares or blocks arranged adjacent to its four corners, said small squares or blocks extending in parallel rows, with numbers for each row and each row having one less number of squares than the preceding row, substantially as set forth.

3. A square game-board having four triangular series of squares or blocks arranged along its four sides adjacent to the four corners, said squares or blocks extending in rows parallel with the diagonals of the square, substantially as set forth.

4. A square game-board having four triangular series of squares or blocks arranged in parallel lines along the four sides adjacent to the corners, a central open space and side open spaces between the said series of squares, and numbers for the rows of squares arranged along the outer edges of the triangular series, as set forth.

5. The combination, in an improved game, of a square board having two or more triangular series of small squares or blocks running in parallel rows, numbers for the rows of squares, suitable counters, and a twirling-disk, substantially as set forth.

STAUGHTON GEORGE.

Witnesses:
E. J. LARKINS,
W. F. KEYS.